Patented Apr. 25, 1950

2,504,983

UNITED STATES PATENT OFFICE 2,504,983

PROCESS FOR MAKING CRYSTALLINE 1-AMINOMANNURONIC AMIDE

Horace S. Isbell and Harriet L. Frush, Washington, D. C., assignors to the United States of America as represented by the Secretary of Commerce No Drawing. Application August 31, 1948, Serial No. 47,135

17 Claims. (Cl. 260—333)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to ammonia derivatives of the uronic acids. Particularly the invention relates to a new series of compounds, the aminoglycuronic amides and a method for producing the same. Still more particularly the invention relates to the production of the aminoaldohexuronic amides: 1-aminogalacturonic amide, 1-aminomannuronic amide, 1-aminoglucuronic amide, and like derivatives.

Heretofore no simple ammonia derivatives of the unsubstituted uronic acids have been prepared.

Accordingly, it is an object of this invention to provide a new series of derivatives of the uronic acids, namely, the aminoglycuronic amides, and a method for the production of these derivatives.

It is still another object of this invention to provide a method for the production of certain new compounds, namely, 1-aminomannuronic amide, 1-aminogalacturonic amide, 1-aminoglucuronic amide, and the like having the following general structural formula:

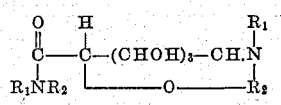

Other objects and advantages of this invention will be apparent or will appear hereinafter.

These objects and advantages are accomplished in accordance with this invention wherein aminoglycuronic amides are prepared by the method which comprises reacting an ester of a uronic acid with an amine reagent having the following general structural formula:

wherein $R_1$ and $R_2$ are hydrogen, alkyl, and aryl radicals and separating the resulting aminoglycuronic amide from the reaction mixture. In a presently preferred embodiment the reaction is carried out in an inert liquid medium in which said aminoglycuronic amide is substantially insoluble whereby an easily recoverable crystalline or solid aminoglycuronic amide is formed.

Suitable esters of the aldohexuronic acids of uronic acids for purposes of this invention include alkyl esters such as methyl galacturonate, methyl mannuronate, ethyl glucuronate, and the like; inner esters such as mannuronic lactone, glucurone, and the like; and other similar derivatives of the oxidized monosaccharides, such as the esters of xyluronic, lyxuronic, and glucohepturonic acids.

Suitable amine reagents for purposes of this invention include gaseous and liquid ammonia, and ammonia derivatives such as the primary and secondary alkyl and aryl amines; for example, methylamine, dimethylamine, ethylmethylamine, diethylamine, aniline, 2-naphthylamine, p-diphenylamine, and like derivatives. For the production of unsubstituted aminoglycuronic amides ammonia in either gaseous or liquid form is presently preferred because of simplicity and economy of operation.

When used, suitable inert liquid media from which the aminoglycuronic amides can be readily separated include methanol, ethanol, dioxane, formamide, isopropanol, and many others. Methanol is presently preferred for reasons of economy and because other reaction products are soluble therein.

In operation of a simple embodiment of the invention the uronic acid ester is dissolved in liquid ammonia and the excess ammonia is distilled off. The product is an aminoglycuronic amide; and if desired, it can be purified by dissolving it in aqueous ammonium hydroxide, filtering through a decolorizing medium such as activated carbon, and effecting crystallization of the aminoglycuronic amide by adding an excess of methanol, ethanol, dioxane, or like precipitating agents for said aminoglycuronic amide.

In another embodiment of the invention the uronic acid ester is suspended in an inert liquid medium in which the end-product amide is relatively insoluble. This suspension is then treated with an amine reagent whereby the ester is dissolved and an aminoglycuronic amide is precipitated. Purification can be carried out as aforementioned. It is presently preferred to carry out the reaction at temperatures not greater than about room temperature, although satisfactory results can be obtained over a wide temperature range.

The following examples will show how the invention may be carried out, but the invention is not to be construed as limited thereto.

*Example 1*

Ten grams of finely powdered mannuronic lactone are suspended in 100 ml. of methanol, and dry ammonia gas is passed into the mixture until the lactone dissolves and 1-aminomannuronic amide crystallizes from solution. After sufficient ammonia is introduced to cause substantially complete crystallization of 1-aminomannuronic amide the mixture is cooled to a temperature of about 5° centigrade and allowed to stand at this temperature for several hours. The crystals which form are then separated by filtration and washed with methanol.

The product so obtained is nearly pure 1-aminomannuronic amide and may be used without purification. In the event that a purer product is desired, the crude amino-amide may be recrystallized by dissolving it at approximately 40° centigrade in 18 parts of aqueous ammonium hydroxide (sp. gr. 0.90), passing the solution through a filter coated with a decolorizing carbon, and diluting the filtrate with approximately three volumes of methanol. The solution, on standing, yields crystalline 1-aminomannuronic amide. The crystals are separated, washed with methanol and air-dried. They correspond to the following formula: $C_6H_{12}O_5N_2$. On heating in a melting point tube, the product darkens and finally melts with decomposition between 145° and 150° centigrade. A freshly prepared aqueous solution gives a specific rotation ($[\alpha]_D^{20}$) of −52° with a slow mutarotation in the dextro direction, apparently caused by a hydrolysis reaction. As shown in the co-pending application of Isbell and Frush, Serial No. 47,136, filed August 31, 1948, one amino group is readily cleaved by acid and hence the amino group is in glycosidic combination. Removal of this amino group gives mannuronic amide. Acetylation of 1-aminomannuronic amide with acetic anhydride and pyridine gives a crystalline tetraacetate that on deacetylation yields crystalline N-acetylaminomannuronic amide. The latter compound reacts with two moles of periodic acid; this is indicative of a pyranose structure. Thus the product of the present invention appears to have the following structure:

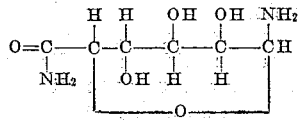

Example 2

Ten grams of finely powdered mannuronic lactone are dissolved in 30 ml. of anhydrous liquid ammonia contained in a flask immersed in a freezing bath of dry ice, chloroform and carbon tetrachloride. After dissolution of the mannuronic lactone, the flask is removed from the freezing bath and the ammonia is allowed to evaporate. The residue consists of substantially pure 1-amino-mannuronic amide.

Example 3

Ten grams of finely powdered mannuronic lactone are suspended in 100 ml. of dioxane, and ammonia gas is introduced at room temperature to the point of saturation over a period of one hour. The mannuronic lactone is converted to 1-aminomannuronic amide which separates from solution in a substantially pure amorphous condition.

Example 4

Five grams of mannuronic lactone are suspended in 75 ml. of ice cold methanol. Ten milliliters of ethylamine are added and the mixture is allowed to stand with occasional shaking. Crystallization of 1-N-ethylamino-N-ethylmannuronic amide occurs in the course of several hours. The crystals are substantially pure but may be recrystallized by dissolving them in methanol at room temperature, passing the solution through a filter coated with a decolorizing carbon, and concentrating the solution, preferably in a vacuum still, to a thin syrup. Crystallization occurs during the evaporation.

In 2 per cent aqueous solution the new compound, 1 - N - ethylamino - N - ethylmannuronic amide has a specific rotation ($[\alpha]_D^{20}$) of −42° (5 minutes after dissolution) which changes in the course of two hours to −24°. Thereafter, there is a very slow change in the same direction over the course of several days.

Example 5

Ten grams of p-aminodiphenyl are dissolved in 350 ml. of methanol and 5 grams of finely powdered mannuronic lactone are added. The mixture is stirred at room temperature until solution is complete (about 1 hour). 1-N-p-diphenylamino-N-diphenylmannuronic amide crystallizes in substantially pure condition. The substance may be recrystallized conveniently from methanol. In a 2-percent pyridine solution $[\alpha]_D^{20} =$ −212° (3 minutes after dissolution); +138° (18 hours after dissolution).

Example 6

Fifty grams of galacturonic acid are esterified by treating with 1500 ml. of ice cold anhydrous 0.02 N-methanolic hydrogen chloride. The mixture is allowed to stand at 0° centigrade for 60 hours and the resulting methyl galacturonate is used in solution without isolation. Ammonia gas is passed into this solution containing methyl galacturonate until it is saturated and the thus treated solution is again allowed to stand at 0° centigrade. A microcrystalline precipitate of 1-aminogalacturonic amide forms during the course of several days. The precipitate is separated by filtration, washed with methanol and dried over calcium chloride.

In 2-percent aqueous solution the crude product exhibits a mutarotation in the levo direction reaching a value of −22.7° in the course of several hours. On acetylation 1-aminogalacturonic amide forms a tetraacetate which, on deacetylation, yields crystalline N-acetylaminogalacturonic amide hydrate, M. P. 105° to 107° centigrade $[\alpha]_D^{20} =$ −48° (water, c=2). For the preparation of 1-aminogalacturonic amide equally satisfactory results are obtained by use of crystalline methyl galacturonate suspended in methanol in place of the solution containing methyl galacturonate.

Example 7

Ten grams of finely powdered glucurone in 150 ml. of anhydrous methanol are treated at room temperature with dry ammonia gas until the solution is substantially saturated. During this process the glucurone dissolves and a flocculent amorphous precipitate forms. The solution is allowed to stand at 0° centigrade for 18 ours, after which the amorphous precipitate is separated and identified as being 1-aminoglucuronic amide. The new substance in 2-percent aqueous solution has a specific rotation of −14° (five minutes after dissolution) and of −9° at the end of 20 hours. By acetylation of 1-aminoglucuronic amide, a tetraacetate is formed which, on deacetylation, yields 1-N-acetylaminoglucuronic amide.

From the foregoing description and examples, it is apparent that a new series of ammonia derivatives of the uronic acids have been prepared and various simple methods for their preparation have been presented.

Since many apparently widely differing embodiments of the invention will occur to one skilled in the art, the invention is not limited to the specific details illustrated and described, and various changes can be made therein without departing from the spirit and scope thereof.

What is claimed is:

1. The method for the production of aminoaldohexuronic amides which comprises dissolving an ester of an aldohexuronic acid in liquid ammonia and distilling off the excess ammonia.

2. The method for the production of 1-aminomannuronic amide which comprises dissolving mannuronic lactone in liquid ammonia and distilling off the excess ammonia.

3. The method for the production of aminoaldohexuronic amides which comprises reacting an ester of an aldohexuronic acid, and ammonia in an inert liquid medium in which said aminoaldohexuronic amide is relatively insoluble and separating the thus formed aminoglycuronic amide from said inert liquid medium.

4. The method for the production of 1-aminomannuronic amide which comprises reacting mannuronic lactone with ammonia in an inert liquid and separating the thus formed 1-aminomannuronic amide from said inert liquid.

5. The method for the production of aminoglycuronic amides having the following general structural formula:

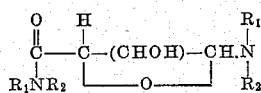

which comprises reacting an ester of an aldohexuronic acid with a reagent having the following general structural formula:

wherein $R_1$ and $R_2$ represent hydrogen, methyl, ethyl, phenyl, naphthyl, and diphenyl radicals and separating the resulting aminoglycuronic amide from the reaction mixture.

6. The method of claim 5 wherein said reaction is carried out in an inert anhydrous liquid medium in which said aminoglycuronic amide is substantially insoluble whereby a crystalline aminoglycuronic amide is formed.

7. The method for the production of aminoglycuronic amides having the following general structural formula:

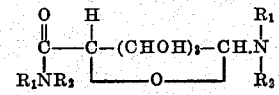

which comprises reacting an ester of an aldohexuronic acid with at least two equivalents of a reagent having the following general structural formula:

wherein $R_1$ and $R_2$ represent hydrogen, methyl, ethyl, phenyl, naphthyl, and diphenyl radicals and separating the resulting aminoglycuronic amide from the reaction mixture.

8. The method for the production of 1-aminomannuronamide which comprises suspending mannuronic lactone in methanol, reacting said suspension with ammonia, and separating the thus formed crystalline 1-aminomannuronamide.

9. The method for the production of 1-aminomannuronamide which comprises suspending 10 grams of mannuronic lactone in 200 ml. of anhydrous methanol, passing dry ammonia gas through said suspension and maintaining the temperature of said mixture at not greater than about 20° centigrade until said mannuronic lactone has dissolved, continuing the passing of said dry ammonia gas into said solution until crystalline 1-aminomannuronamide is formed, and separating the thus formed 1-aminomannuronamide.

10. The method for the production of 1-aminoglucuronic amide which comprises reacting glucurone with ammonia in methanol and separating the resulting 1-aminoglucuronic amide.

11. The method for the production of 1-aminogalacturonic amide which comprises reacting methyl galacturonate with ammonia in dioxane and separating the resulting 1-aminogalacturonic amide.

12. The composition of matter: 1-aminouronic amide corresponding to the formula: $C_6H_{12}O_5N_2$.

13. The composition of matter: 1-aminomannuronic amide.

14. The composition of matter: 1-N-ethylamino-N-ethylmannuronic amide.

15. The composition of matter: 1-aminogalacturonic amide.

16. The composition of matter: 1-N-p-diphenylamino-N-diphenylmannuronic amide.

17. The composition of matter: 1-aminoglucuronic amide.

HORACE S. ISBELL.
HARRIET L. FRUSH.

REFERENCES CITED

The following references are of record in the file of this patent:

UNITED STATES PATENTS

| Number | Name | Date |
|---|---|---|
| 2,380,739 | Evans et al. | July 31, 1945 |

Certificate of Correction

April 25, 1950

Patent No. 2,504,983

HORACE S. ISBELL ET AL.

It is hereby certified that errors appear in the printed specification of the above numbered patent requiring correction as follows:

Column 1, line 53, after the word "esters" strike out "of the aldohexuronic acids" and insert the same after "esters" in line 55, same column;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*